(12) United States Patent
Liu

(10) Patent No.: US 9,631,654 B2
(45) Date of Patent: Apr. 25, 2017

(54) FASTENING MEMBER AND DEVICE HAVING THE SAME

(71) Applicant: Wistron Corporation, New Taipei (TW)

(72) Inventor: Tzu-Yin Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 426 days.

(21) Appl. No.: 14/334,053

(22) Filed: Jul. 17, 2014

(65) Prior Publication Data

US 2015/0192157 A1  Jul. 9, 2015

(30) Foreign Application Priority Data

Jan. 8, 2014 (TW) .............................. 103100638 A

(51) Int. Cl.
*F16B 5/06* (2006.01)
*F16B 21/02* (2006.01)
*F16B 21/09* (2006.01)

(52) U.S. Cl.
CPC .......... *F16B 5/0642* (2013.01); *F16B 5/0664* (2013.01); *F16B 21/02* (2013.01); *F16B 21/09* (2013.01); *Y10T 403/602* (2015.01)

(58) Field of Classification Search
CPC ........ F16B 5/06; F16B 5/0642; F16B 5/0685; F16B 5/0628; F16B 21/086; *F16B 21/09*

(Continued)

(56) References Cited

U.S. PATENT DOCUMENTS 2,526,532 A * 10/1950 Bedford, Jr. ............ F16B 5/125
  24/453
2,809,413 A * 10/1957 Wootton .................... F16B 5/06
  24/581.11

(Continued)

FOREIGN PATENT DOCUMENTS

GB  563799 A  8/1994
TW  444648  7/2001

(Continued)

OTHER PUBLICATIONS

The Office Action issued to Taiwanese Counterpart Application No. 103100638 by the Taiwan Intellectual Property Office on Oct. 13, 2015 along with an English translation of sections boxed in red.

(Continued)

*Primary Examiner* — Daniel Wiley
(74) *Attorney, Agent, or Firm* — Winston Hsu; Scott Margo

(57) ABSTRACT

A fastening member for fastening and unfastening at least two panel members includes first and second elastic arms. One panel member has a first surface. The other panel member has a second surface facing away from the first surface. Each panel member has a fixed through hole having at least a portion with a width ($P_1$). Each elastic arm has first and second end edges respectively proximate to and relatively distal from the first surface. The first end edge has a width larger than the width ($P_1$). A limiting arm extends from the first end edge of the first elastic arm, and includes a limiting portion that can extend through the fixed through holes of the panel members or move away from the second elastic arm when the elastic arms are pressed or released, respectively.

20 Claims, 16 Drawing Sheets

(58) Field of Classification Search
CPC ............. Y10T 24/44026; Y10T 24/303; Y10T 24/304; Y10T 24/307; Y10T 24/42
See application file for complete search history.

(56) References Cited

U.S. PATENT DOCUMENTS

| | | | | |
|---|---|---|---|---|
| 3,024,509 | A * | 3/1962 | Hamann | F16B 5/06 24/453 |
| 3,673,643 | A * | 7/1972 | Kindell | F16B 2/241 126/190 |
| 4,438,552 | A * | 3/1984 | Omata | F16B 5/10 24/297 |
| 4,576,535 | A * | 3/1986 | Howering | F16B 5/0642 24/453 |
| 5,241,727 | A * | 9/1993 | Lee | H01J 29/06 24/295 |
| 5,377,662 | A * | 1/1995 | Mills | F24H 9/02 126/110 R |
| 7,267,361 | B2 * | 9/2007 | Hofmann | B60R 21/213 24/293 |
| 7,729,127 | B2 * | 6/2010 | Yeh | G06F 1/183 361/803 |
| 8,496,420 | B2 * | 7/2013 | Aoki | F16B 5/0642 411/45 |

FOREIGN PATENT DOCUMENTS

TW  M370284 U1  12/2009
TW  M408736 U1  8/2011

OTHER PUBLICATIONS

The Office Action issued to Chinese Counterpart Application No. 201410051472.X by the State Intellectual Property Office of the P.R.C. on Jun. 2, 2016 along with an English translation of sections boxed in red.

* cited by examiner

FASTENING MEMBER AND DEVICE HAVING THE SAME

CROSS-REFERENCE TO RELATED APPLICATION

This application claims priority of Taiwanese Application No. 103100638, filed on Jan. 8, 2014, the disclosure of which is incorporated herein by reference.

BACKGROUND OF THE DISCLOSURE

1. Field of the Disclosure

This disclosure relates to a fastening member, and more particularly to a fastening member that can fasten and unfasten at least two panel members without the use of a tool and a device having the fastening member.

2. Description of the Related Art

Currently, to connect two panel members together, a screw or rivet is used. A server 9 is exemplified and illustrated in FIG. 1. The server 9 has a housing including a rear panel 91 preformed with a PCI slot 901, and a door panel 92 pivoted to the rear panel 91 at a side edge of the PCI slot 901 for covering the same. With the door panel 92 covering the PCI slot 901 and prior to insertion of a PCI interface card (not shown) into the PCI slot 901, anti-dust and shield effects can be achieved. To insert the PCI interface card, the door panel 92 is rotated away from the rear panel 91 to expose the PCI slot 901.

To fasten the door panel 92 to the rear panel 91, generally, a tool must be used to extend at least one screw (not shown) through the door panel 92 and screwing into a corresponding screw hole in the rear panel 91. Because the tool is necessary to assemble or disassemble the screw, and because the screw must be taken care of after disassembly to prevent the lost thereof, another fastening member is developed, that is, a thumb screw.

If the thumb screw (not shown) is used to fix the door panel 92 to the rear panel 91, although the thumb screw has the advantage of dispensing with the need of a tool and the lost thereof can be prevented, the cost of the thumb screw is high and does not meet the low cost requirement.

SUMMARY OF THE DISCLOSURE

Therefore, an object of the present disclosure is to provide a fastening member that can replace a thumb screw and that can fasten and unfasten at least two panel members without the use of a tool. Further, there is no need to worry about the fastening member being lost after unfastening the panel members.

Another object of the present disclosure is to provide a device having the aforesaid fastening member.

According to one aspect of disclosure of the present disclosure, a fastening member for fastening and unfastening at least two panel members that are disposed one over the other comprises first and second elastic arms, a connecting portion and a limiting arm. One of the panel members has a first surface. The other one of the panel members has a second surface facing away from the first surface. Each panel member has a fixed through hole. The fixed through hole has at least a portion with a width ($P_1$) extending in a first direction parallel to a width of each panel member. The first and second elastic arms are spaced apart from each other in an elastic direction that is perpendicular to the first direction. Each of the first and second elastic arms has a first end edge for being proximate to the first surface, and a second end edge for being relatively distal from the first surface. The first end edge has a width larger than the width ($P_1$). The connecting portion is connected between the second end edges of the first and second elastic arms to allow the first and second elastic arms to move toward or away from each other along the elastic direction. The limiting arm extends from the first end edge of the first elastic arm, and includes a neck portion and a limiting portion. The neck portion is proximate to the first end edge and has a width ($W_1$) equal to or slightly less than the width ($P_1$). The limiting portion is connected to one end of the neck portion distal from the first end edge, and has a projected area larger than that of the neck portion. When the first and second elastic arms are pressed to move the limiting arm close to the second elastic arm, the limiting portion can extend through the fixed through holes of the panel members and out of the second surface. When the first and second elastic arms are released from being pressed, the limiting arm moves away from the second elastic arm, a surface of the limiting portion that is proximate to the neck portion abuts against the second surface, and the neck portion abuts against peripheral edges of the fixed through holes in the elastic direction.

Preferably, the connecting portion has an arc-shaped cross section that is open toward the first and second elastic arms. More preferably, one of the first and second elastic arms has an arc-shaped cross section that is open toward the other one of the first and second elastic arms, and a radius of curvature of the one of the first and second elastic arms is different from that of the connecting portion.

Preferably, the neck portion and the limiting portion are located on the same plane. The fixed through hole of each panel member includes a narrow long portion extending in the first direction and having a width ($P_2$), and a receiving portion extending from a long side of the narrow long portion and having the width ($P_1$) which is smaller than the width ($P_2$). The limiting portion has a width ($W_2$) in the first direction equal to or slightly less than the width ($P_2$) so that the limiting portion can extend through the narrow long portions of the fixed through holes of the panel members. The neck portion is adapted to be received in the receiving portions of the fixed through holes of the panel members when the limiting arm moves away from the second elastic arm.

The aforesaid limiting arm may be one or two. When the limiting arm is one, the fastening member further comprises a fixed arm extending from the first end edge of the second elastic arm. The fixed arm includes a fixed portion extending in a direction away from the limiting arm for fixed connection with the first surface. When the limiting arm is two, the two limiting arms respectively extend from the first end edges of the first and second elastic arms. The fixed through hole of each panel member includes a narrow long portion extending in the first direction and having a width ($P_2$), and two receiving portions respectively extending from two opposite long sides of the narrow long portion away from each other. Each of the receiving portions has the width ($P_1$) which is smaller than the width ($P_2$). The limiting arms are respectively and symmetrically disposed in the receiving portions when the first and second elastic arms are released from being pressed.

Preferably, the neck portion and the limiting portion of the limiting arm are located in mutually perpendicular planes and have similar width ($W_1$). The limiting portion has a length ($L_1$) in the elastic direction. The fixed through hole of each panel member has a length in the elastic direction at least equal to the length ($L_1$). When the first and second elastic arms are pressed, the limiting portion can extend through the fixed through holes of the panel members. Through this, the limiting portion of the limiting arm is limited at one side of the fixed through holes in the elastic direction.

The aforesaid limiting arm may be one or two. When the limiting arm is two, the two limiting arms respectively extend from the first end edges of the first and second elastic arms. The limiting arms are symmetrically provided. The length of the fixed through hole of each panel member in the elastic direction is equal to at least twice the length ($L_1$). When the first and second elastic arms are pressed, the limiting portions of the limiting arms can extend through the fixed through holes of the panel members.

According to another aspect of this disclosure, a device comprises at least two panel members disposed one over the other, and a fastening member. One of the panel members has a first surface. The other one of the panel members has a second surface facing away from the first surface. Each of the panel members has a fixed through hole. The fixed through hole has at least a portion with a width ($P_1$) extending in a first direction. The fastening member for fastening and unfastening the panel members includes first and second elastic arms, a connecting portion and a limiting arm. The first and second elastic arms are spaced apart from each other in an elastic direction that is perpendicular to the first direction. Each of the first and second elastic arms has a first end edge proximate to the first surface, and a second end edge relatively distal from the first surface. The first end edge has a width larger than the width ($P_1$). The connecting portion is connected between the second end edges of the first and second elastic arms to allow the first and second elastic arms to move toward or away from each other along the elastic direction. The limiting arm extends from the first end edge of the first elastic arm, and includes a neck portion proximate to the first end edge and having a width ($W_1$) equal to or slightly less than the width ($P_1$), and a limiting portion extending from one end of the neck portion distal from the first end edge and having a projected area larger than that of the neck portion. When the first and second elastic arms are pressed to move the limiting arm close to the second elastic arm, the limiting portion can extend through the fixed through holes of the panel members and out of the second surface. When the first and second elastic arms are released from being pressed, the limiting arm moves away from the second elastic arm, a surface of the limiting portion that is proximate to the neck portion abuts against the second surface, and the neck portion abuts against peripheral edges of the fixed through holes in the elastic direction.

When the neck portion and the limiting portion are located on the same plane and the limiting arm is two, the fixed through hole of each panel member further includes a neck-rotating portion. The neck-rotating portion includes two straight sections respectively spaced apart from the receiving portions in the elastic direction, at least two curved sections each extending curvedly from one end of a respective receiving portion distal from the narrow long portion and symmetrically opposite to each other, and two shoulder sections each connected between one of the curved sections and one end of the straight section. Each of the curved sections has a radius of curvature equal to $\frac{1}{2}(P_1)$. The shoulder sections are provided for abutment with the neck portions of the limiting arms.

When the neck portion and the limiting portion of the limiting arm are located in mutually perpendicular planes and have similar width ($W_1$), and when the limiting portion has a length ($L_1$) in the elastic direction, the fixed through hole of each panel member has a length in the elastic direction equal to at least twice the length ($L_1$). When the first and second elastic arms are pressed, the limiting portion can extend through the fixed through holes of the panel members.

Preferably, one of the panel members further has at least one protrusion protruding toward the other one of the panel members. The other one of the panel members further has an aperture corresponding in shape to the protrusion for extension of the latter therethrough.

The efficiency of this disclosure resides in that the fastening member of the present disclosure can fasten and unfasten at least two panel members without the use of a tool. The fastening member is simply disposed on a fixed through hole of one of the panel members, so that there is no need to worry about the fastening member being lost. Indeed, the demand of cost reduction can be met.

BRIEF DESCRIPTION OF THE DRAWINGS

Other features and advantages of the present disclosure will become apparent in the following detailed description of the embodiments of the disclosure, with reference to the accompanying drawings, in which.

DETAILED DESCRIPTION OF THE EMBODIMENTS

Figure 1:
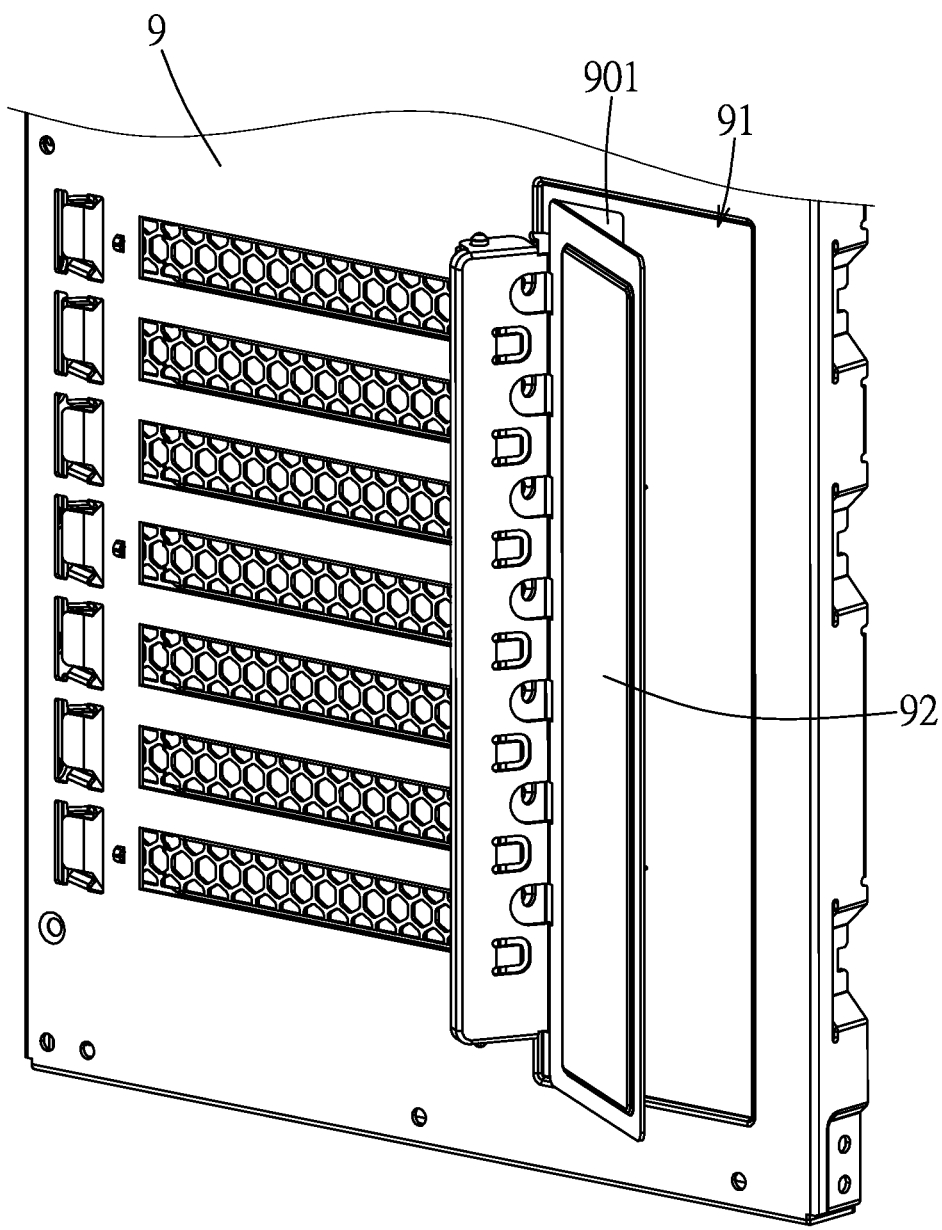
FIG. 1 is a fragmentary perspective view of a server, illustrating how a door panel may be conventionally fastened to a rear panel of a housing of the server.

Before this disclosure is described in detail, it should be noted that, in the following description, similar elements are designated by the same reference numerals.

Figure 2:
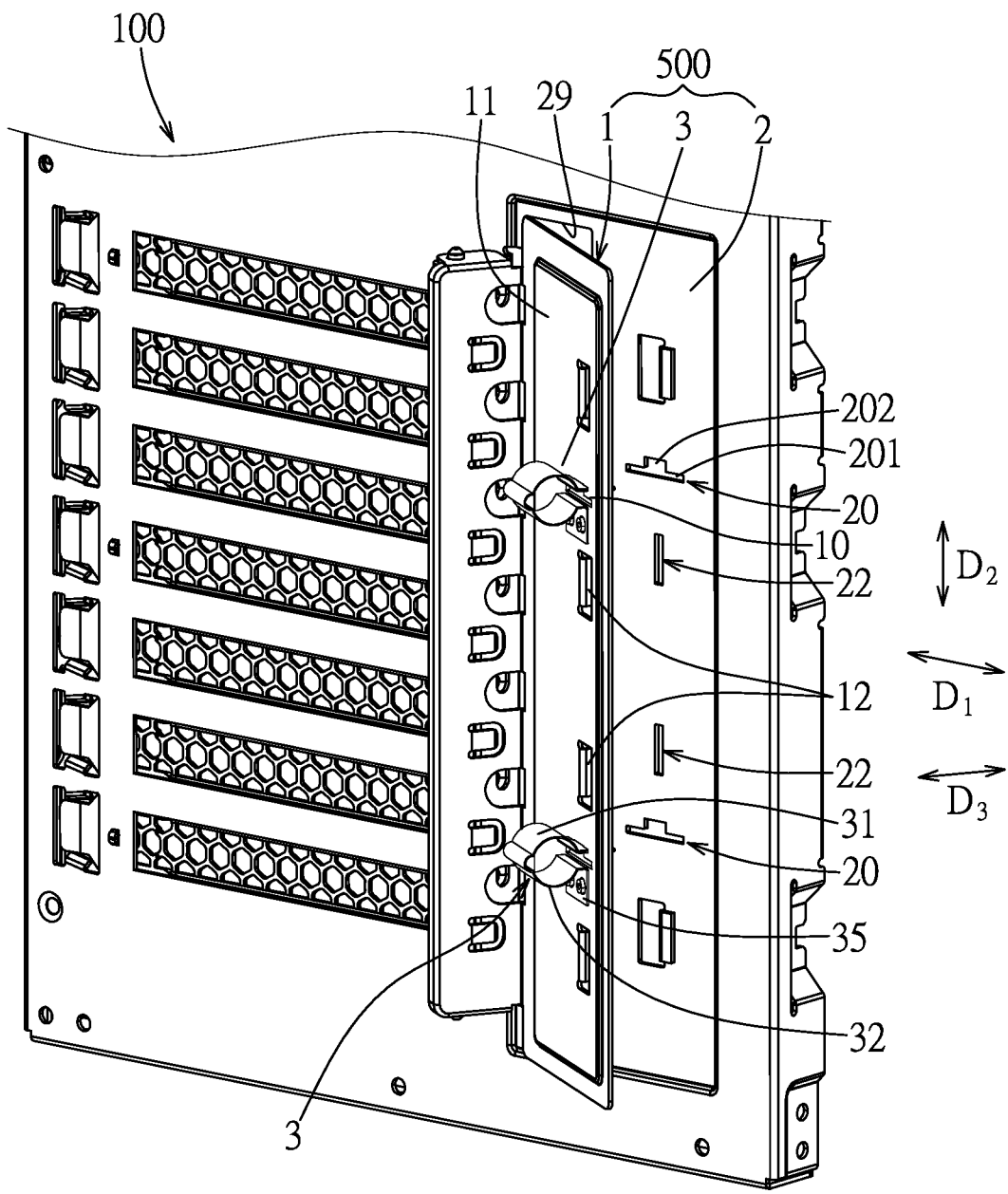
FIG. 2 is a view similar to FIG. 1, but illustrating the server incorporating a device according to the first embodiment of the present disclosure.
Figure 3:
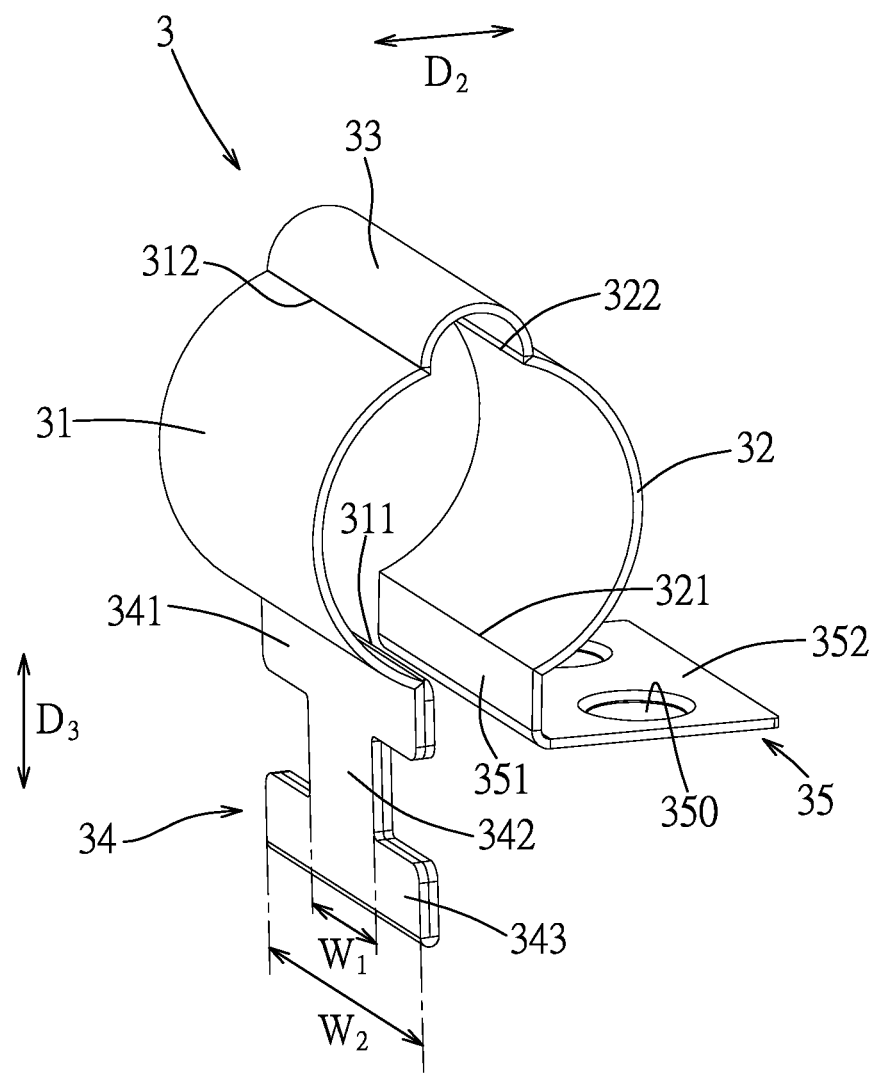
FIG. 3 is an enlarged perspective view of a fastening member of the device of the first embodiment.
Figure 4:
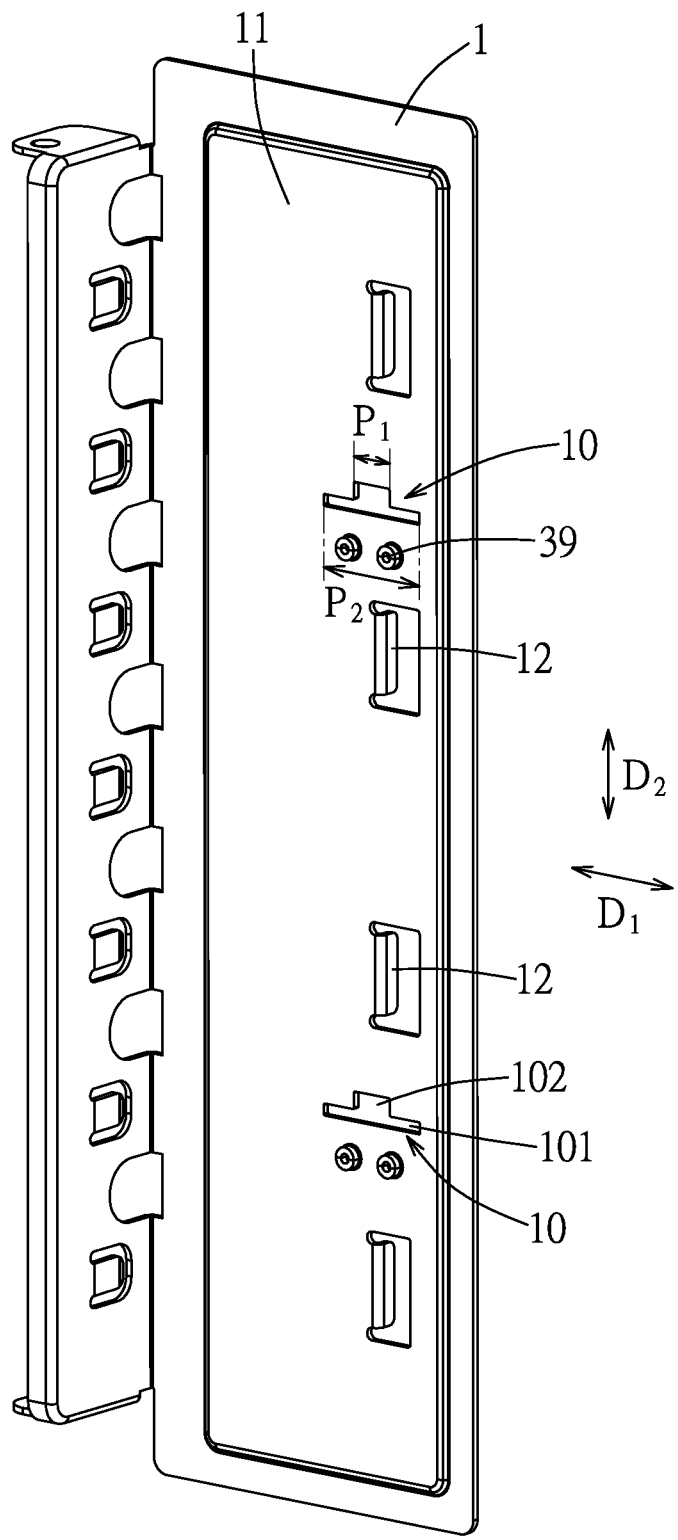
FIG. 4 is an enlarged perspective view of a panel member of the device of the first embodiment, which is in the form of a door panel.

Referring to FIGS. 2, 3 and 4, a device 500 according to the first embodiment of the present disclosure is shown incorporated in a server 100. The device 500 comprises two panel members 1, 2 and two fastening members 3.

In this embodiment, the panel member 1 is exemplified as a door panel, while the panel member 2 is exemplified as a rear panel of a housing of the server 100. The panel member 2 is preformed with a PCI slot 29. The panel member 1 has one end pivoted to the panel member 2 at a side edge of the PCI slot 29, so that the panel member 1 is pivotable relative to the panel member 2 to cover or expose the PCI slot 29. The panel members 1, 2 are disposed one over the other when the panel member 1 covers the PCI slot 29. The fastening members 3 are used to fasten and unfasten the panel member 1 to and from the panel member 2.

The panel member 1 has a first surface 11 facing away from the panel member 2, two spaced-apart fixed through holes 10, and a plurality of spaced-apart protrusions 12 protruding toward the panel member 2. The panel member 2 has a second surface 21 facing away from the first surface 11, two fixed through holes 20 corresponding in shape and position to the fixed through holes 10, and a plurality of apertures 22 corresponding in shape and position to the protrusions 12 for extension of the latter therethrough.

It should be noted that, although each of the panel members 1, 2 is formed with two fixed through holes 10, 20 and two fastening members 3 are used in this embodiment, the number of the fixed through holes 10, 20 and the fastening members 3 are not limited as such. Further, because the fixed through holes 10, 20 in the panel members 1, 2 are similar in shape, only the fixed through hole 10 in the panel member 1 will be described below for the sake of brevity and clarity.

The fixed through hole 10 includes a narrow long portion 101 extending in a first direction ($D_1$) (left-right direction in FIG. 4) and having a width ($P_2$) which is parallel to a width of the panel member 1, and a receiving portion 102 extending from one long side of the narrow long portion 101 and having a width ($P_1$) which is smaller than the width ($P_2$), i.e., ($P_2$)<($P_2$).

Each fastening member 3 of this embodiment includes a first elastic arm 31, a second elastic arm 32, a connecting portion 33, a limiting arm 34 and a fixed arm 35. The first and second elastic arms 31, 32 are spaced apart from each other in an elastic direction ($D_2$) that is perpendicular to the first direction ($D_1$). Each of the first and second elastic arms 31, 32 has a first end edge 311, 321 proximate to the first surface 11, and a second end edge 312, 322 relatively distal from the first surface 11. That is, the first end edge 311, 321 and the second end edge 312, 322 are respectively proximate to and distal from the first surface 11 in a limiting direction ($D_3$) that is transverse to the first direction ($D_1$) and the elastic direction ($D_2$).

The connecting portion 33 has an arc-shaped cross section that is open toward the first and second elastic arms 31, 32, but is not limited as such. The connecting portion 33 may open in an opposite direction, or may have a V- or U-shaped cross section. The connecting portion 33 is connected between the second end edges 312, 322 of the first and second elastic arms 31, 32 to allow the first and second elastic arms 31, 32 to move toward or away from each other along the elastic direction ($D_2$). In this embodiment, each of the first and second elastic arms 31, 32 and the connecting portion 33 has a semi-circular cross section. The semi-circular first and second elastic arms 31, 32 and the semi-circular connecting portion 33 are open toward each other. Each of the first and second elastic arms 31, 32 has a radius of curvature larger than that of the connecting portion 33, but is not limited as such. The first and second elastic arms 31, 32 may not be symmetrical, or may have a diametral, V- or U-shaped cross section.

The first end edge 311, 321 of each of the first and second elastic arms 31, 32 has a width in the first direction ($D_1$) larger than the width ($P_1$). The limiting arm 34 includes an extension portion 341 extending from the first end edge 311 of the first elastic arm 31 in the limiting direction ($D_3$) and having a width similar to that of the first end edge 311, a neck portion 342 extending from one end of the extension portion 341 in the limiting direction ($D_3$) and having a width ($W_1$) equal to or slightly less than the width ($P_1$), and a limiting portion 343 extending from one end of the neck portion 342 distal from the first end edge 311 in the limiting direction ($D_3$). The neck portion 342 has a length in the limiting direction ($D_3$) equal to or slightly greater than the sum of the thicknesses of the panel members 1, 2. Through this, the limiting effect described below can be achieved.

The limiting portion 343 has a projected area along the limiting direction ($D_3$) larger than that of the neck portion 342. Specifically, the neck portion 342 and the limiting portion 343 are located on the same plane, and the limiting portion 343 has a width ($W_2$) in the first direction ($D_1$) larger than the width ($P_1$), so that the projected area of the limiting portion 343 is larger than that of the neck portion 342. Further, the width ($W_2$) of the limiting portion 343 is equal to or slightly less than the width ($P_2$), and the thickness of the limiting portion 343 is equal to or less than a width of a short side of the narrow long portion 101 of the fixed through hole 10 [i.e., the width in the elastic direction ($D_2$)]. Through this, the limiting portion 343 can extend through the narrow long portion 101 of the fixed through hole 10.

The fixed arm 35 includes an extension portion 351 extending from the first end edge 321 of the second elastic arm 32 in the limiting direction ($D_3$), and a fixed portion 352 bending and extending perpendicularly from one end of the extension portion 351 in the elastic direction ($D_2$) away from the limiting arm 34. The fixed portion 352 is plate-shaped, and has at least one through slot 350. In this embodiment, the fixed portion 352 has two spaced-apart through slots 350 for extension of two screws 39 respectively therethrough. Through the screws 39, the fastening member 3 can be initially fixed to the first surface 11 proximate to another long side of the narrow long portion 101. The limiting arm 34 of the fastening member 3 is also initially extended through the fixed through hole 10 at this stage. It should be noted that the method of fixing the fastening member 3 to the panel member 1 is not limited to using the screws 39. The fastening member 3 may be fixed to the panel member 1 by using a welding, riveting, or any suitable fixing method.

In this embodiment, the fastening member 3 is a metal stamping member, but is not limited as such. The limiting arm 34 may be made by using a metal that is thicker than or having a strength different from that of the connecting portion 33. Further, the fastening member 3 may also be formed integrally as one piece from plastic, or after all the portions of the fastening member 3 are respectively formed, these portions of the fastening member 3 are interconnected to form one body by an injection molding process, by heat melting or by riveting.

Figure 5:
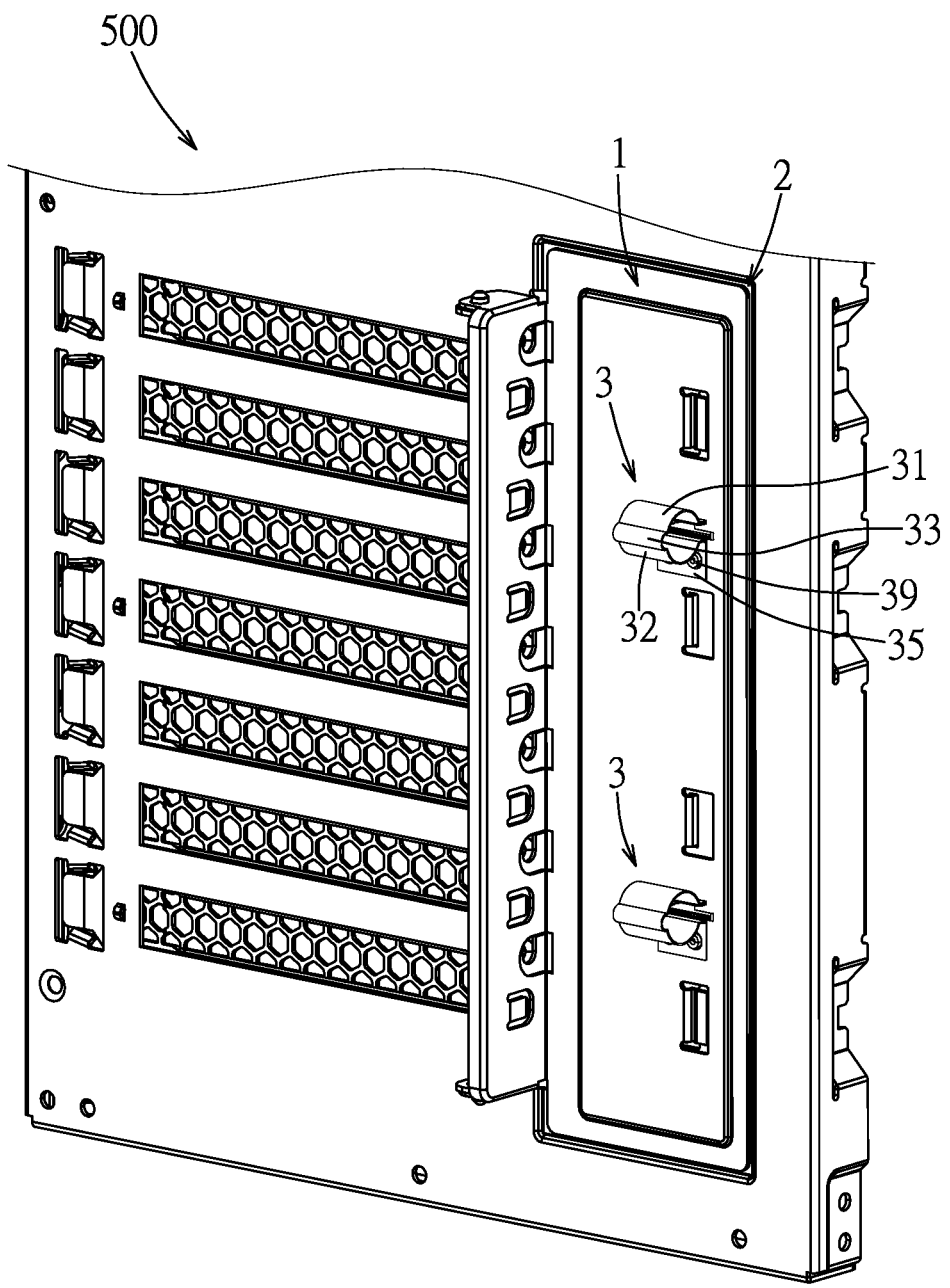
FIG. 5 is a view similar to FIG. 2, but illustrating how the fastening member fastens the door panel to another panel member of the device, which is in the form of a rear panel of a housing of the server.
Figure 6:
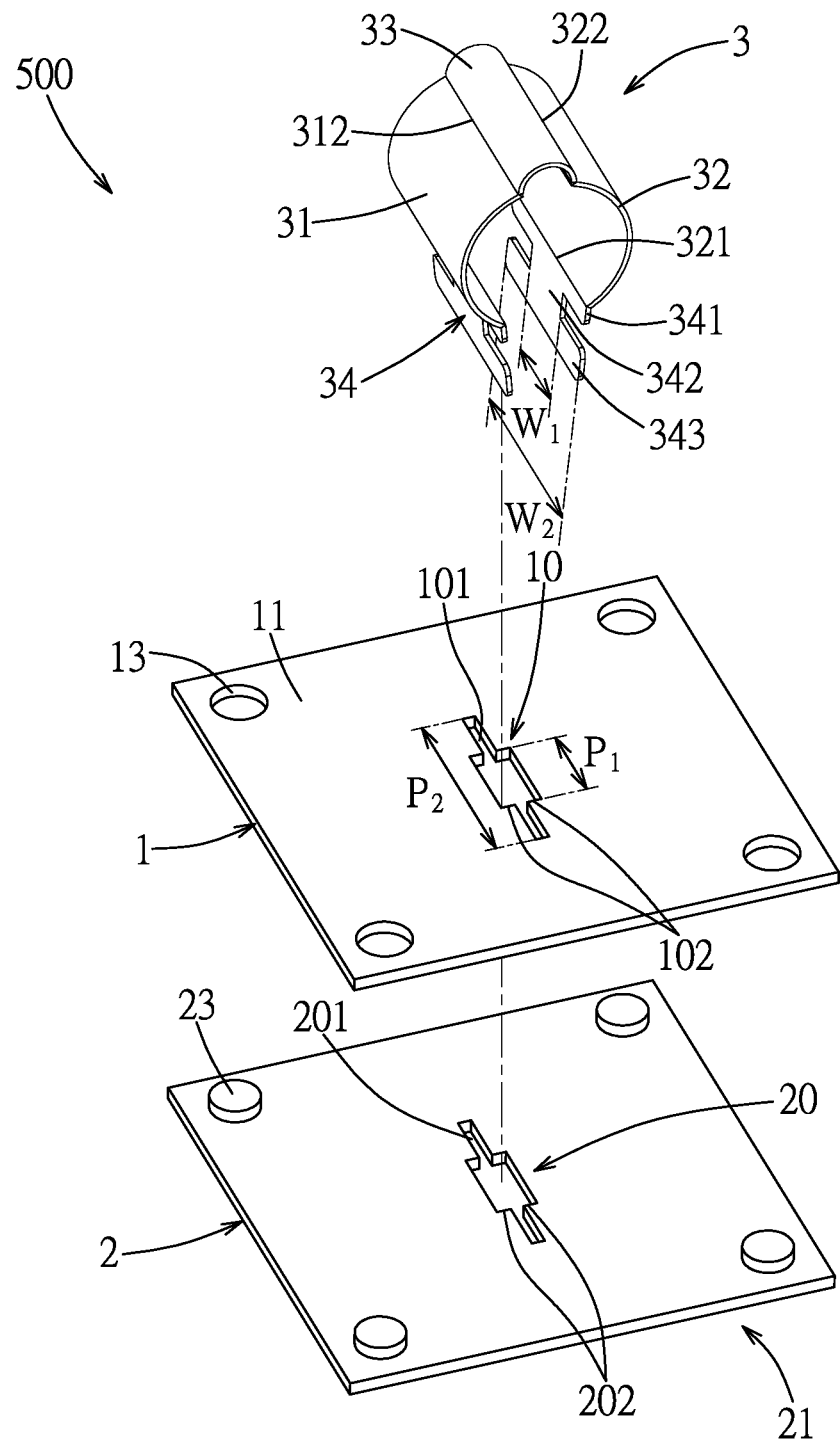
FIG. 6 is an exploded perspective view of the device according to the second embodiment of the present disclosure.
Figure 7:
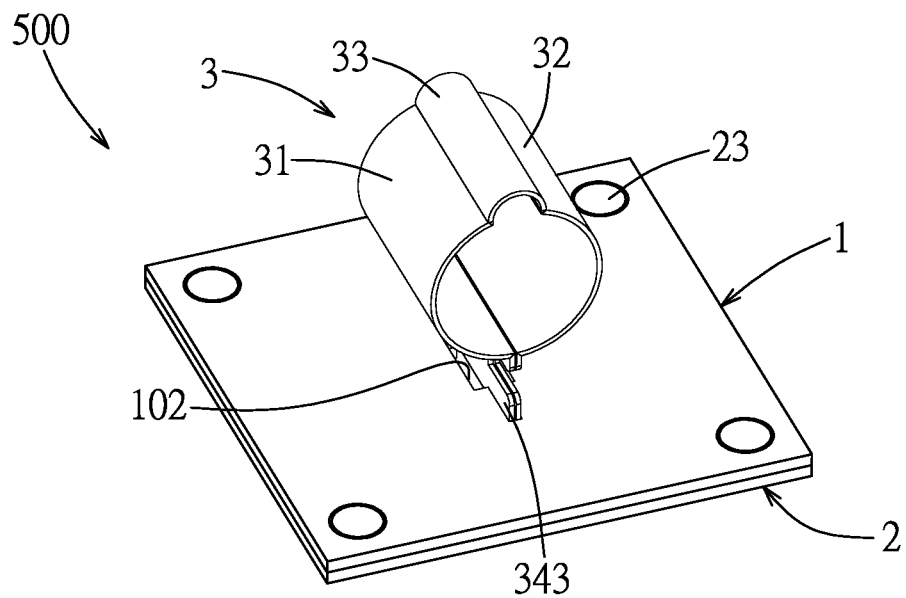
FIGS. 7 and 8 illustrate consecutive steps of how the fastening member of the second embodiment interconnects two panel members.
Figure 8:
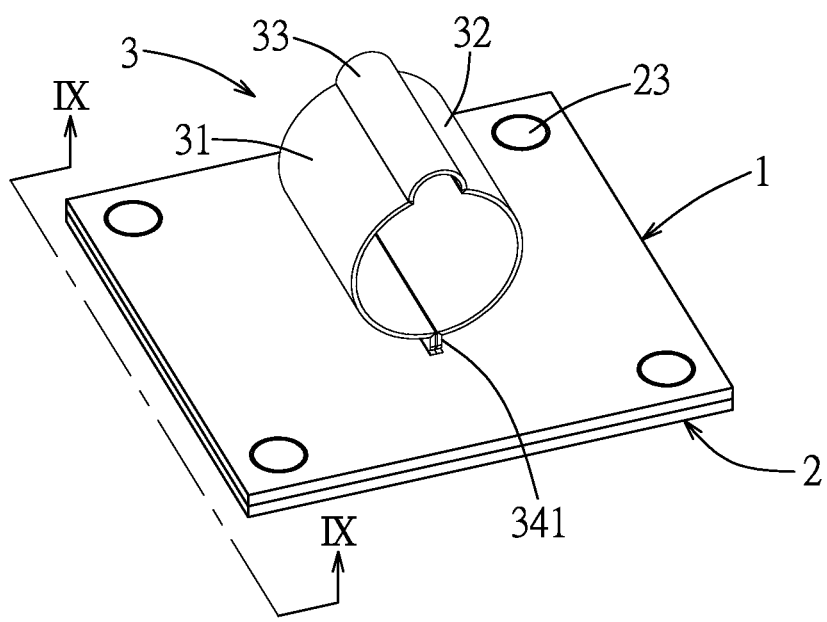
Figure 9:
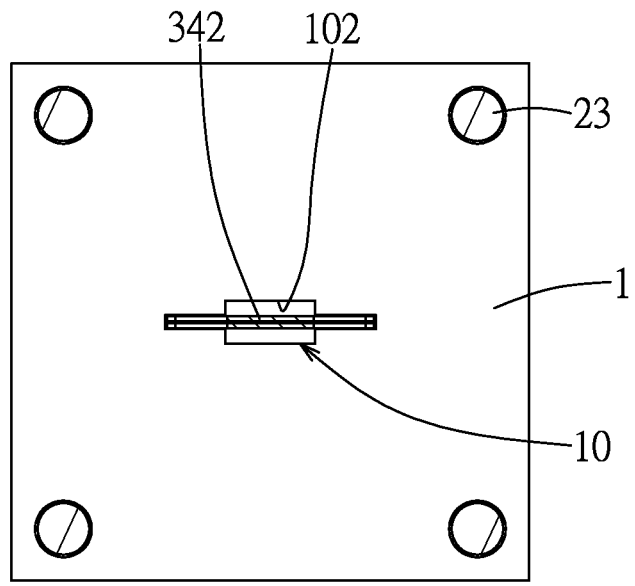
FIG. 9 is a sectional view of the second embodiment taken along line IX-IX of FIG. 8.
Figure 10:
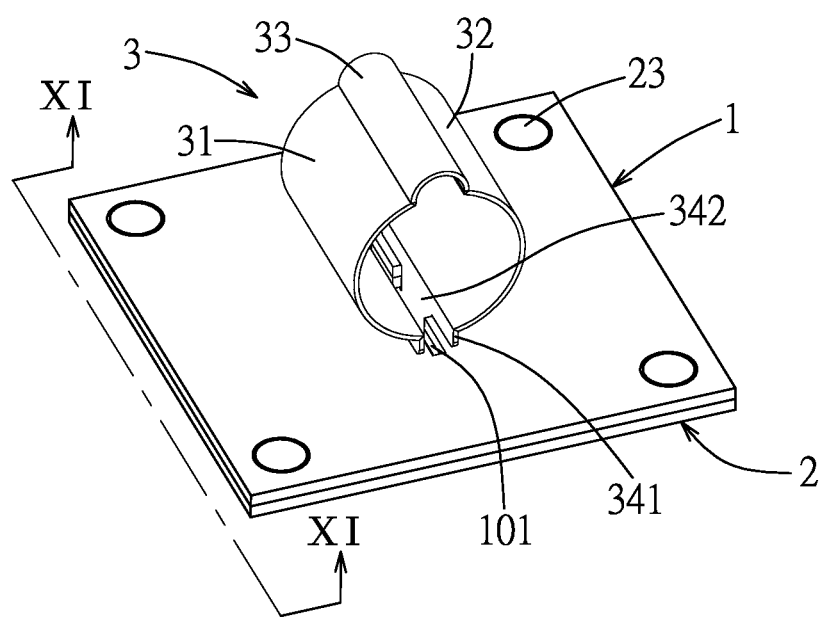
FIG. 10 is an assembled perspective view of FIG. 6.

Referring to FIG. 5, in combination with FIG. 2, to position the panel member 1 on the panel member 2, the first and second elastic arms 31, 32 are pressed or pinched together to move the limiting arm 34 from the receiving portion 102 of the fixed through hole 10 to the narrow long portion 101 thereof. Specifically, when the first and second elastic arms 31, 32 are pressed to move the limiting arm 34 near the fixed arm 35, the limiting portion 343 is also moved to align with the narrow long portion 101. At this time, the panel member 1 is gradually moved toward the panel member 2 until the limiting portion 343 passes through the narrow long portion 201 of the fixed through hole 20 of the panel member 2. With the panel members 1, 2 disposed one over the other, the extension portion 341 is still located on the first surface 11, the neck portion 342 is sunk into the panel members 1, 2, and the limiting portion 343 is located outwardly of the second surface 21. The first and second elastic arms 31, 32 can be released from being pressed at this time. Upon the release of the first and second elastic arms 31, 32, the limiting arm 34 resiliently moves away from the fixed arm 35. A surface of the extension portion 341 that is proximate to the neck portion 342 abuts against the first surface 11, and a surface of the limiting portion 343 that is proximate to the neck portion 342 abuts against the second surface 21. Furthermore, the neck portion 342 is received in the receiving portions 102, 202 of the fixed through holes 10, 20 of the panel members 1, 2, and abuts against peripheral edges of the receiving portions 102, 202 in the elastic direction ($D_2$).

Through the aforesaid configuration, the limiting portion 343 of the limiting arm 34 is limited on the second surface 21 in the limiting direction ($D_3$), so that the panel member 1 cannot be separated from the panel member 2. Hence, the panel member 1 is retained and fastened to the panel member 2.

Additionally, when the panel member 1 is fastened to the panel member 2, the protrusions 12 of the panel member 1 simultaneously extend into the respective apertures 22 of the panel member 2. This restricts relative movement of the panel members 1, 2 in a parallel direction. In this embodiment, the protrusions 12 and the apertures 22 are elongated, but are not limited as such. Further, the positions of the protrusions and the apertures may be interchanged, that is, the panel member 2 may have the protrusions, while the panel member 1 may have the apertures.

FIGS. 6 to 12 illustrate the second embodiment of the present disclosure. The main difference between the first and second embodiments resides in the structure of the fastening member 3 and the corresponding fixed through holes 10, 20 in the panel members 1, 2. In this embodiment, the fastening member 3 includes two limiting arms 34 respectively extending from the first end edges 311, 321 of the first and second elastic arms 31, 32 in the limiting direction ($D_3$). The fixed arm 35 (see FIG. 3) is dispensed in this embodiment. The limiting arms 34 are symmetrically disposed in this embodiment, but are not limited as such. The limiting arms 34 may be disposed non-symmetrically according to the requirement. The fixed through holes 10, 20 in the panel members 1, 2 correspond in shape to that of the limiting arms 34, so that the fixed through holes 10, 20 are also in symmetry. That is, taking for example the fixed through hole 10, the fixed through hole 10 has two receiving portions 102 respectively extending from two opposite long sides of the narrow long portion 101 away from each other. If the limiting arms 34 are not symmetrical, for example, the widths thereof are different, the shape of the fixed through hole 10 is also non-symmetric. That is, the widths of the receiving portions 102 of the fixed through hole 10 are different.

Furthermore, the panel member 1 has four spaced-apart circular apertures 13 at four corners thereof, while the panel member 2 has four cylindrical protrusions 23 that protrude toward the panel member 1 and that correspond in shape and position with the apertures 13. It is understandable that the number, location and shape of the apertures 13 and the protrusions 23 are not limited to the aforesaid disclosure.

As shown in FIGS. 7 to 12, to position the panel member 1 on the panel member 2, the panel members 1, 2 are first superimposed, after which the protrusions 23 are inserted into the respective apertures 13 to restrict relative movement of the panel members 1, 2 in a parallel direction. Next, the first and second elastic arms 31, 32 are pressed or pinched together to move the limiting arms 34 toward each other and abut against each other (see FIG. 7). Afterwards, the limiting portions 343 of the limiting arms 34 are inserted through the narrow long portions 101, 201 of the fixed through holes 10, 20 (see FIGS. 8 and 9), such that the neck portions 342 of the limiting arms 34 are sunk into the panel members 1, 2, the extension portions 341 are exposed from the first surface 11, and the limiting portions 343 are located outwardly of the second surface 21 (see FIG. 12). The first and second elastic arms 31, 32 can be released from being pressed at this time.

Figure 11:
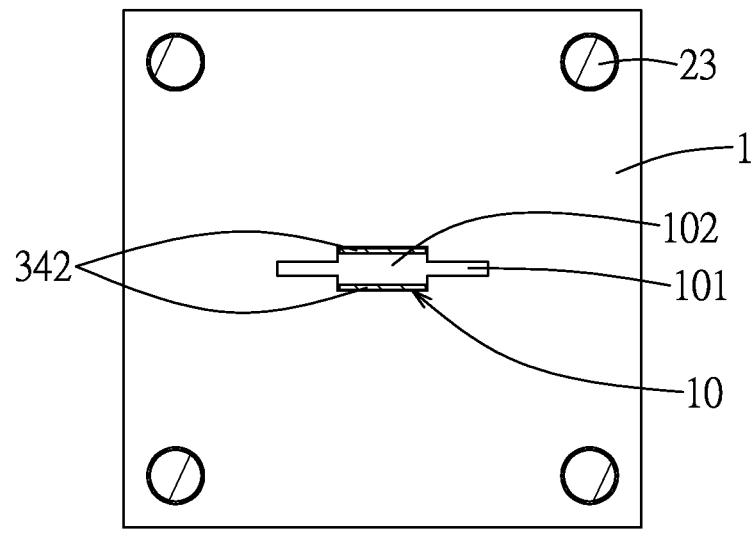
FIG. 11 is a sectional view of the second embodiment taken along line XI-XI of FIG. 10.
Figure 12:
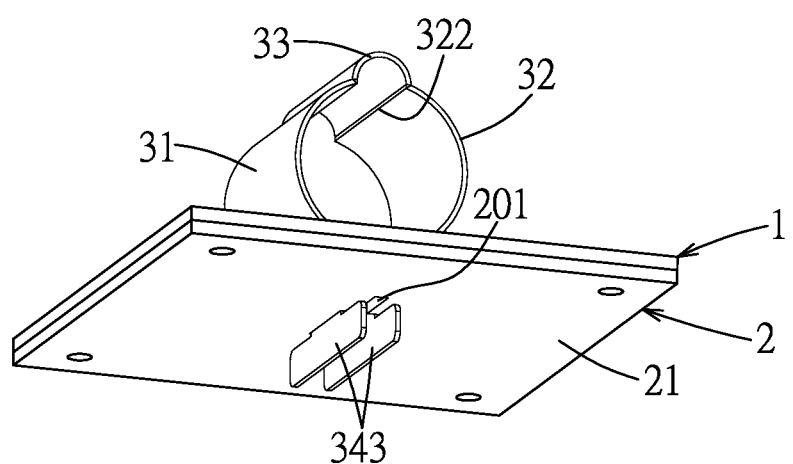
FIG. 12 is an assembled perspective view of FIG. 6 taken from another angle.

When the first and second elastic arms 31, 32 are released, the two limiting arms 34 move resiliently and oppositely away from each other (see FIG. 11). During this time, a surface of the extension portion 341 of each limiting arm 34 that is proximate to the neck portion 342 abuts against the first surface 11, and a surface of the limiting portion 343 of each limiting arm 34 that is proximate to the neck portion 342 abuts against the second surface 21. Moreover, the neck portion 342 of each limiting arm 34 is received in one of the receiving portions 102 of the fixed through hole 10 and the corresponding receiving portion 202 of the fixed through hole 20, and abuts against peripheral edges of the corresponding receiving portions 102, 202 in the elastic direction ($D_2$).

Through the aforesaid configuration, the limiting portion 343 of each limiting arm 34 is limited on the second surface 21 in the limiting direction ($D_3$), so that the panel members 1, 2 cannot be separated from each other. Hence, the panel member 1 is retained and fastened to the panel member 2.

Figure 13:
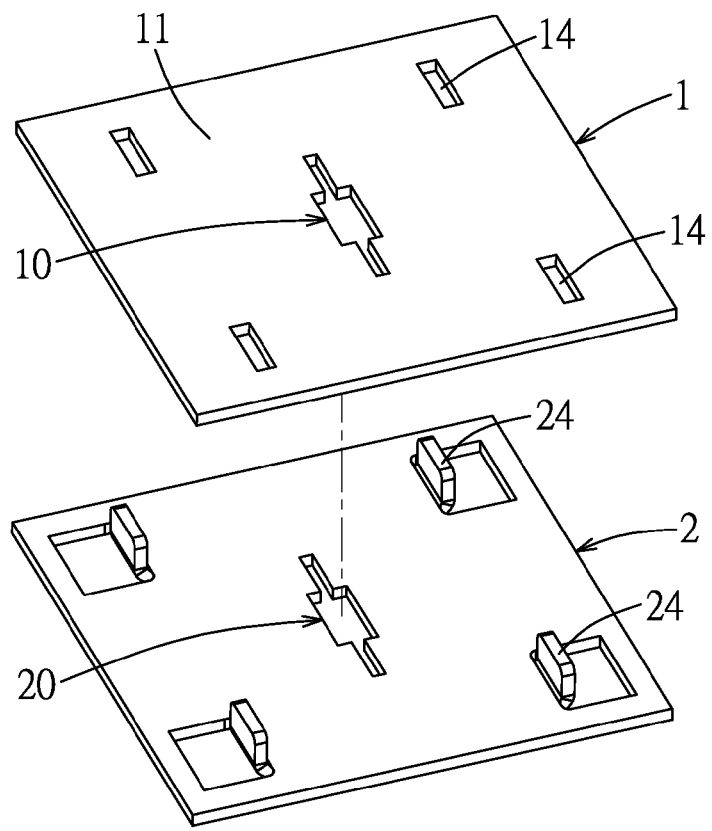
FIG. 13 illustrates alternative forms of the panel members.
Figure 14:
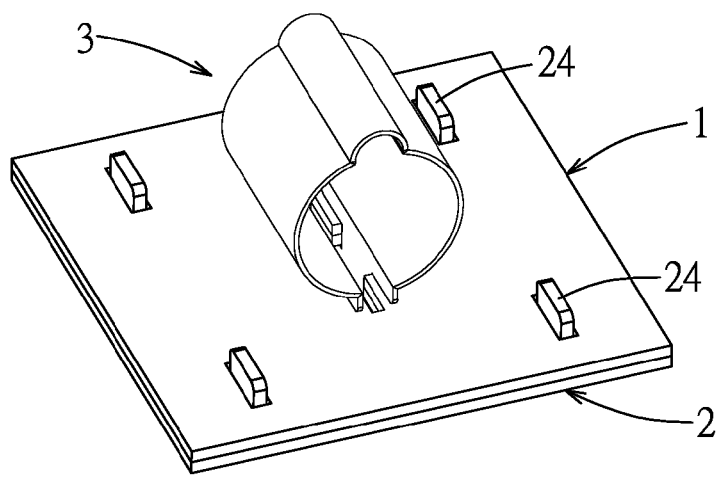
FIG. 14 is an assembled perspective view of the alternative form of the device of the second embodiment.
Figure 15:
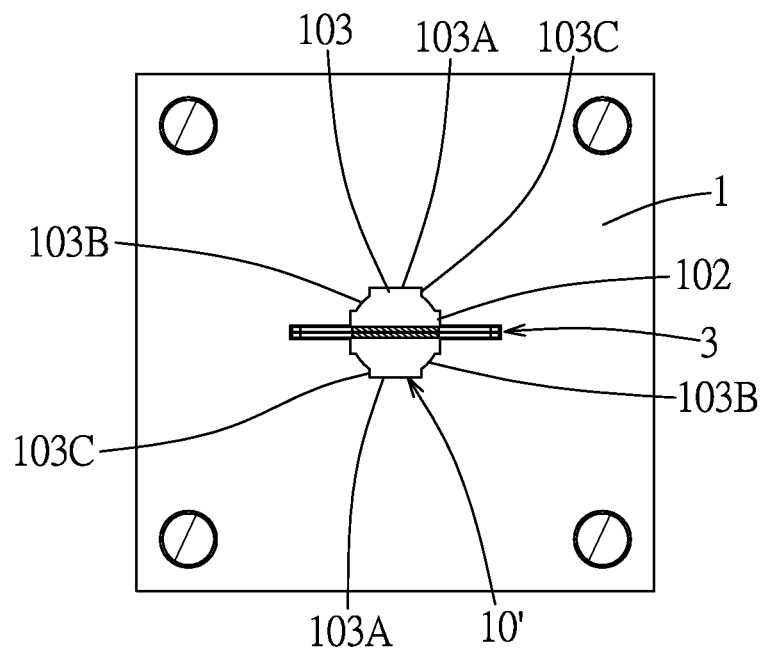
FIGS. 15 to 18 illustrate consecutive steps of how the fastening member of the second embodiment interconnects the two panel members which have a first variation of fixed through holes.
Figure 16:
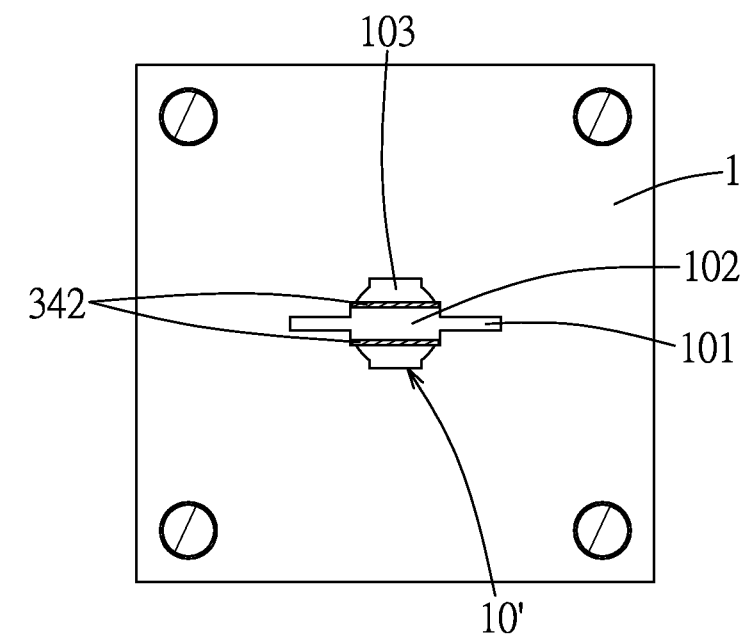

The apertures 13 in the panel member 1 and the protrusions 23 in the panel member 2 may be elongated in shape, but are not limited as such. Further, the positions of the protrusions and the apertures may be interchanged. Concretely speaking, referring to FIGS. 13 and 14, the panel member 1 is shown to have elongated apertures 14, while the panel member 2 is shown to have elongated protrusions 24. The purpose of restricting relative movement of the panel members 1, 2 in the parallel direction may also be achieved.

FIGS. 15 to 18 illustrate a first variation of the fixed through holes 10' and 20' (not shown) of this embodiment. In this variation, since the structures of the fixed through holes 10' and 20' are similar, only the structure of the fixed through hole 10' will be described hereinafter for the sake of brevity and clarity.

The fixed through hole 10' further includes a neck-rotating portion 103. The neck-rotating portion 103 includes two straight sections (103A) respectively spaced apart from the receiving portions 102 in the elastic direction ($D_2$), four curved sections (103B), and four shoulder sections (103C). Two of the curved sections (103B) respectively extend from two opposite ends of one of the receiving portions 102, while the other two curved sections (103B) respectively extend from two opposite ends of the other receiving portion 102. Each of the shoulder sections (103C) is connected between one of the curved sections (103B) and a corresponding end of the straight section (103A). Each of the curved sections (103B) has a radius of curvature equal to ½($P_1$).

Figure 17:
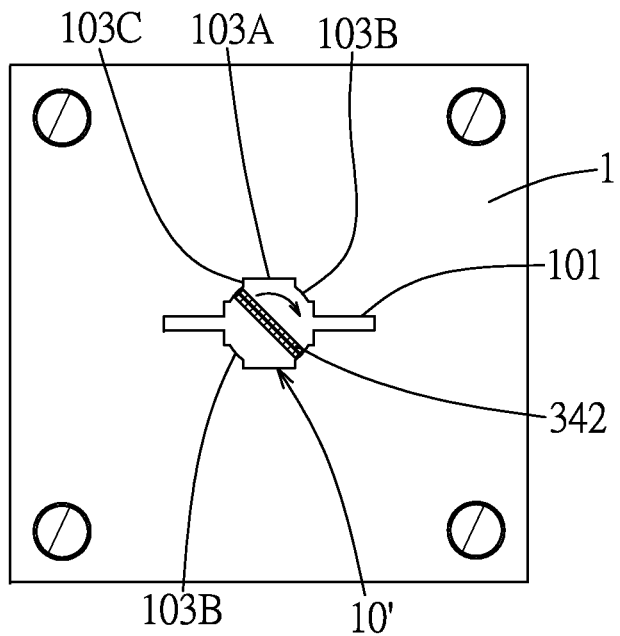
Figure 18:
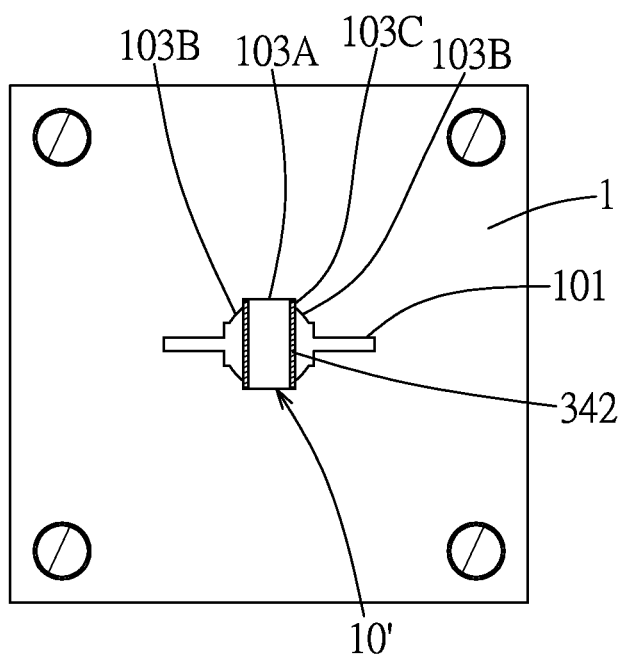

In the first variation, the first and second elastic arms 31, 32 of the fastening member 3 are pinched together and inserted into the narrow long portion 101 of the fixed through hole 10', after which the fastening member 3 is rotated, as shown in FIG. 17. Because the radius of curvature of each curved section (103B) is ½($P_1$) and the width ($W_1$) of the neck portion 342 is equal to or slightly less than the width ($P_1$), the neck portion 342 is rotatable in the fixed through hole 10'. When the fastening member 3 is rotated to an angle of 90°, pinching of the first and second elastic arms 31, 32 can be released. When the first and second elastic arms 31, 32 are released, the limiting arms 34 move oppositely and resiliently away from each other, as shown in FIG. 18, and the neck portions 342 abut against the shoulder sections (103C). Through this, even if the first and second elastic arms 31, 32 are pinched together, they cannot be easily separated and removed from the panel members 1, 2 because it is necessary to rotate the first and second elastic arms 31, 32 to an angle of 90° firstly before the limiting portions 343 of the limiting arms 34 can be moved out of the narrow long portion 101. Only then can the first and second elastic arms 31, 32 be separated and removed from the panel members 1, 2.

Figure 19:
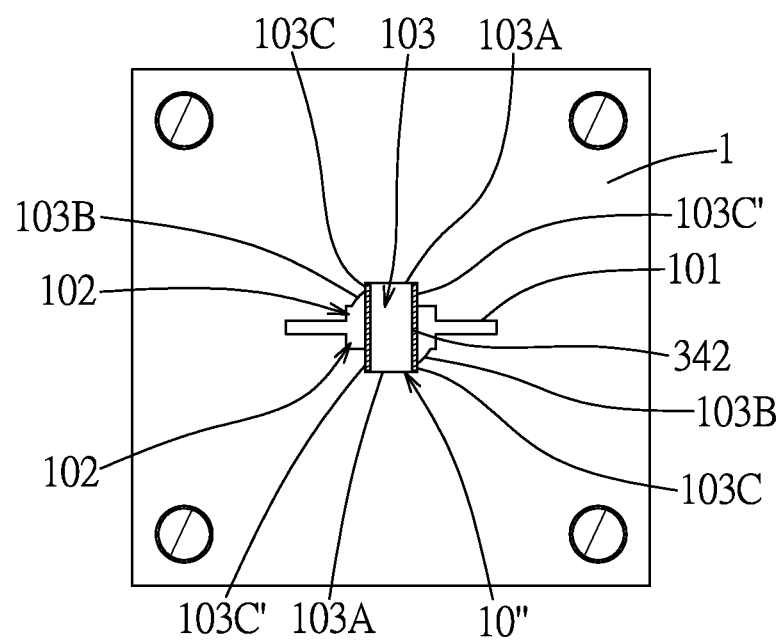
FIG. 19 illustrates how the fastening member of the second embodiment interconnects the two panel members which have a second variation of the fixed through holes.
Figure 20:
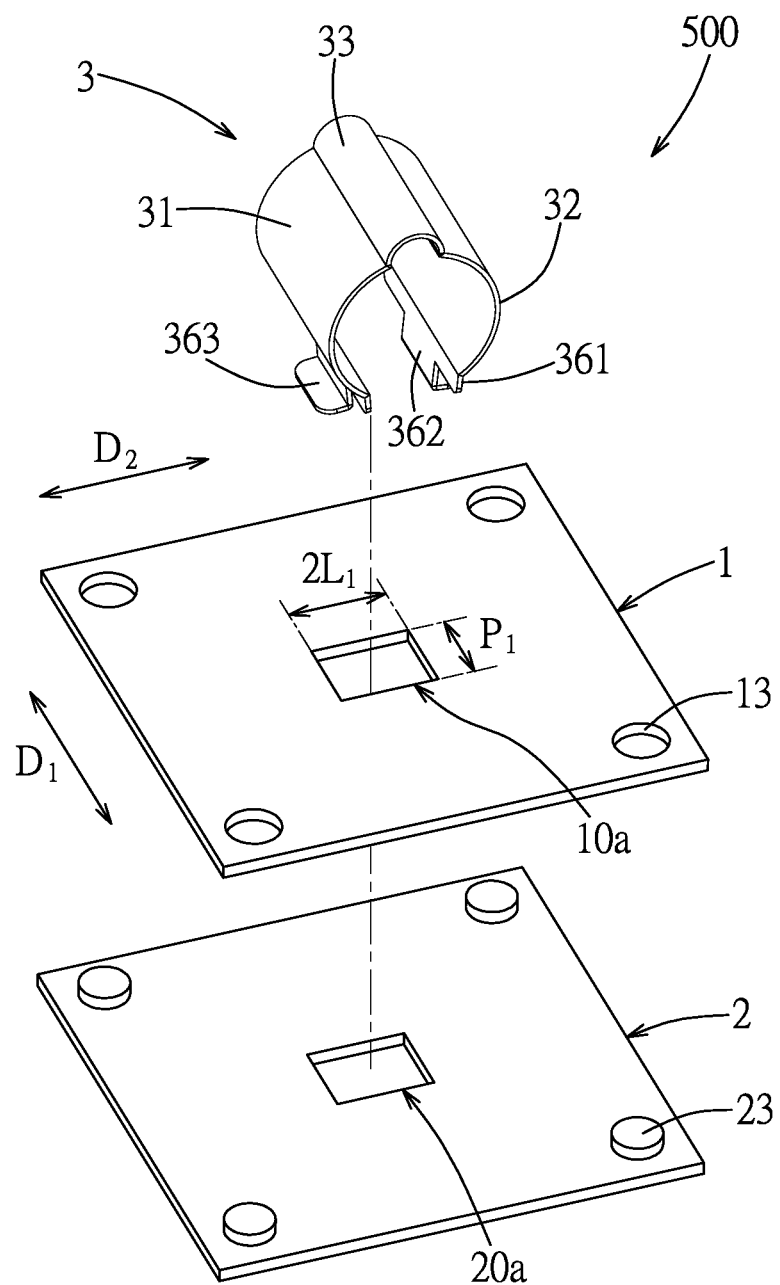
FIG. 20 is an exploded perspective view of the device according to the third embodiment of the present disclosure.
Figure 21:
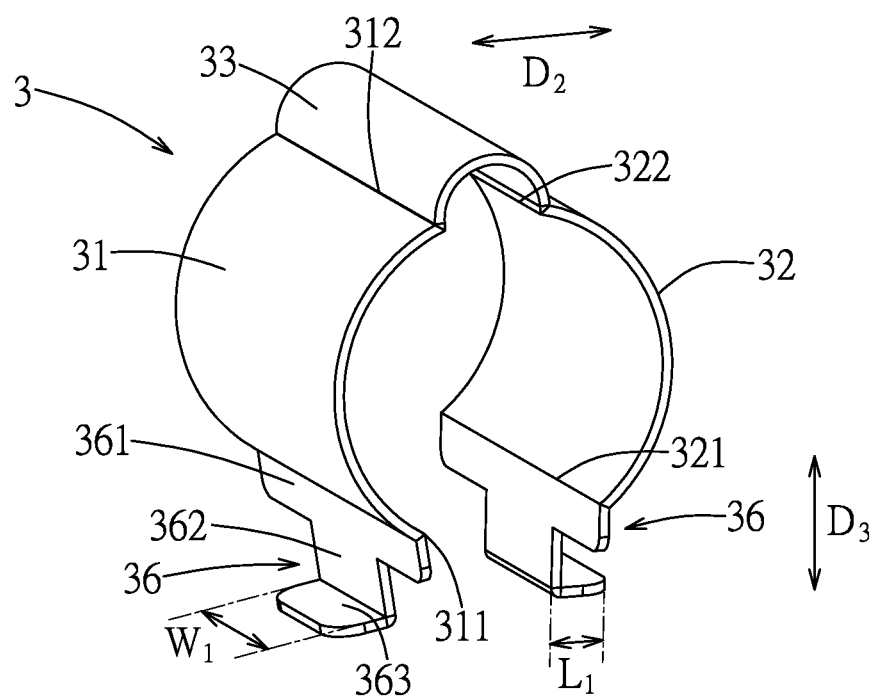
FIG. 21 is an enlarged perspective view of a fastening member of the device of the third embodiment.

FIG. 19 illustrates a second variation of the fixed through holes 10" and 20" (not shown) of this embodiment. The second variation is substantially similar to the first variation. The difference resides in that, in the second variation, the neck-rotating portion 103 only includes two curved sections (103B) spaced apart from each other at an angle of 180°. One end of each straight section (103A) is connected to the corresponding curved section (103B) through the shoulder section (103C), while the other end thereof is connected to the receiving portion 102 through a shoulder section (103C'). The shoulder section (103C') is perpendicular to and is connected between the other end of each straight section (103A) and the corresponding receiving portion 102. Through this, the fastening member 3 can only rotate in a single direction to an angle of 90°.

FIGS. 20 to 23 illustrate the third embodiment of the present disclosure. The difference between the third and second embodiments resides in the structure of the limiting arms of the fastening member 3 and the corresponding fixed through holes (10a, 20a) in the panel members 1, 2.

In this embodiment, each of the limiting arms 36 of the fastening member 3 includes an extension portion 361 extending from the first end edge 311 of the first elastic arm 31 in the limiting direction ($D_3$) and having a width similar to that of the first end edge 311, a neck portion 362 extending from one end of the extension portion 361 in the limiting direction ($D_3$) and having a width ($W_1$) equal to or slightly less than the width ($P_1$), and a limiting portion 363 extending transversely from one end of the neck portion 362 distal from the extension portion 361 in the elastic direction ($D_2$). The limiting portion 363 has a width similar to the width ($W_1$) of the neck portion 362, and a length ($L_1$). Specifically, the neck portion 362 and the limiting portion 363 are located in mutually perpendicular planes. The limiting portion 363 has a projected area in the limiting direction ($D_3$) larger than that of the neck portion 362.

Each of the fixed through holes (10a, 20a) has a width in the first direction ($D_1$) equal to the width ($P_1$), and a length in the elastic direction ($D_2$) equal to or larger than twice the length ($L_1$). Thus, when the first and second elastic arms 31, 32 are pressed, the limiting portions 363 of the limiting arms 36 can extend through the fixed through holes (10a, 20a). After the limiting portions 363 extend through the fixed through holes (10a, 20a) and out of the second surface 21, the neck portions 362 are sunk into the panel members 1, 2, and the extension portions 361 are exposed from the first surface 11. The first and second elastic arms 31, 32 can be released from being pressed at this time.

Figure 22:
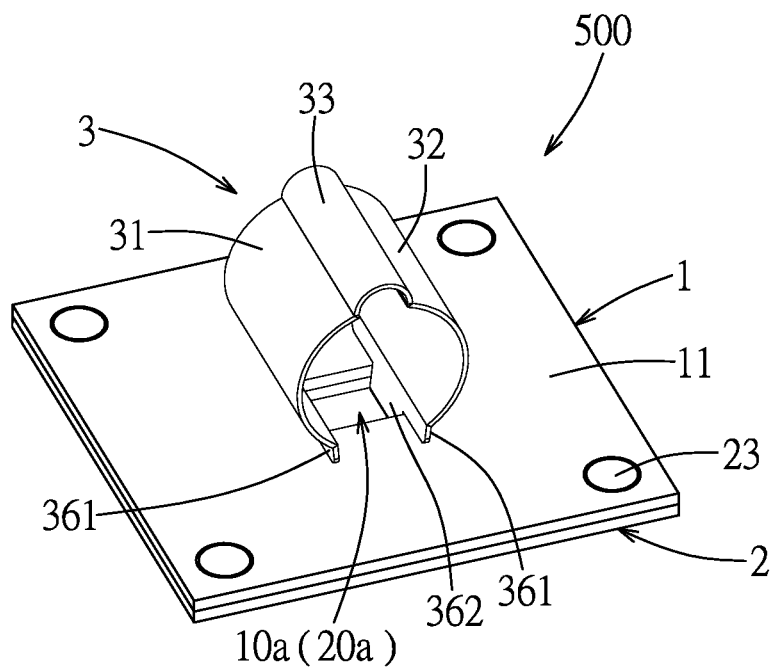
FIG. 22 is an assembled perspective view of the device of the third embodiment.
Figure 23:
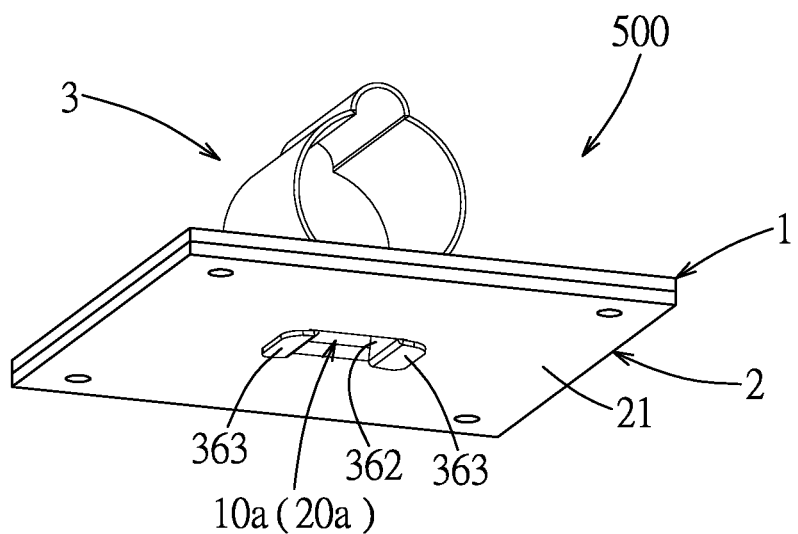
FIG. 23 is another assembled perspective view of the device of the third embodiment taken from another angle.

With reference to FIGS. 22 and 23, after the first and second elastic arms 31, 32 are released, the limiting arms 36 move oppositely and resiliently away from each other. During this time, a surface of the extension portion 361 of each limiting arm 36 that is proximate to the neck portion 362 abuts against the first surface 11, and a surface of the limiting portion 363 of each limiting arm 36 that is proximate to the neck portion 362 abuts against the second surface 21. Moreover, the neck portion 362 of each limiting arm 36 is received in the fixed through holes (10a, 20a), and abuts against peripheral edges of the fixed through holes (10a, 20a) in the elastic direction ($D_2$).

Through the aforesaid configuration, the limiting portion 363 of each limiting arm 36 is limited on the second surface 21 in the limiting direction ($D_3$), so that the panel members 1, 2 cannot be separated from each other. Hence, the panel member 1 is retained and fastened to the panel member 2.

It is worth mentioning that the aforesaid limiting arm 36 may be similar to that of the first embodiment, i.e., the number of the limiting arm 36 may be one only and may coordinate with the fixed arm 35 (see FIG. 3) which is fixed to the panel member 1. Further, the widths of the fixed through holes in the panel members 1, 2 in the elastic direction ($D_2$) may be equal to or slightly larger than the length ($L_1$).

In summary, the fastening member 3 described in each embodiment can fasten and unfasten the panel member 1 to and from the panel member 2 without the use of a tool. Further, after the panel member 1 is unfastened from the panel member 2, it is only necessary to dispose the fastening member 3 in the fixed through hole 10, 10', 10", (10a), 20, 20', 20", (20a) of one of the panel members 1, 2. There is no need to worry about the fastening member 3 being lost. Indeed, the demand of cost reduction can be met. Therefore, the objects of the present disclosure can be achieved.

While the present disclosure has been described in connection with what are considered the most practical embodiments, it is understood that this disclosure is not limited to the disclosed embodiments but is intended to cover various arrangements included within the spirit and scope of the broadest interpretations and equivalent arrangements.

I claim:

1. A fastening member for fastening and unfastening at least two panel members that are disposed one over the other, one of the panel members having a first surface, the other one of the panel members having a second surface facing away from the first surface, each of the panel members further having a fixed through hole, the fixed through hole having at least a portion with a width ($P_1$) extending in a first direction parallel to a width of each panel member, said fastening member comprising:

first and second elastic arms spaced apart from each other in an elastic direction that is perpendicular to the first direction, each of said first and second elastic arms having a first end edge for being proximate to the first surface, and a second end edge for being relatively distal from the first surface, said first end edge having a width larger than the width ($P_1$);

a connecting portion connected between said second end edges of said first and second elastic arms to allow said first and second elastic arms to move toward or away from each other along the elastic direction;

a limiting arm extending from said first end edge of said first elastic arm and including
  a neck portion proximate to said first end edge and having a width ($W_1$) equal to or slightly less than the width ($P_1$), and
  a limiting portion extending from one end of said neck portion distal from said first end edge and having a projected area larger than that of said neck portion; and a fixed arm extending from said first end edge of said second elastic arm, said fixed arm including a fixed portion extending in a direction away from said limiting arm for fixed connection with the first surface;

wherein, when said first and second elastic arms are pressed to move said limiting arm close to said second elastic arm, said limiting portion can extend through the fixed through holes of the panel members and out of the second surface; and when said first and second elastic arms are released from being pressed, said limiting arm moves away from said second elastic arm, a surface of said limiting portion that is proximate to said neck portion abuts against the second surface, and said neck portion abuts against peripheral edges of the fixed through holes in the elastic direction.

2. The fastening member as claimed in claim 1, wherein said connecting portion has an arc-shaped cross section that is open toward said first and second elastic arms.

3. The fastening member as claimed in claim 2, wherein one of said first and second elastic arms has an arc-shaped cross section that is open toward the other one of said first and second elastic arms, and a radius of curvature of said one of said first and second elastic arms being different from that of said connecting portion.

4. The fastening member as claimed in claim 1, wherein said neck portion and said limiting portion of said limiting arm are located in mutually perpendicular planes and have similar width (W1), said limiting portion having a length (L1) in the elastic direction, the fixed through hole of each panel member further having a length in the elastic direction at least equal to the length (L1), and wherein, when said first and second elastic arms are pressed, said limiting portion can extend through the fixed through holes of the panel members.

5. The fastening member as claimed in claim 4, wherein said fastening member further comprises another limiting arm extending from said first end edge of said second elastic arm, said two limiting arms being symmetrically provided, and wherein, when said first and second elastic arms are pressed, said limiting portions of said limiting arms can extend through the fixed through holes of the panel members.

6. A device comprising:
  at least two panel members disposed one over the other, one of said panel members having a first surface, the other one of said panel members having a second surface facing away from said first surface, each of said panel members further having a fixed through hole, said fixed through hole having at least a portion with a width ($P_1$) extending in a first direction parallel to a width of each said panel member; and a fastening member for fastening and unfastening said panel members and including
    first and second elastic arms spaced apart from each other in an elastic direction that is perpendicular to the first direction, each of said first and second elastic arms having a first end edge proximate to said first surface, and a second end edge relatively distal from said first surface, said first end edge having a width larger than the width ($P_1$);
    a connecting portion connected between said second end edges of said first and second elastic arms to allow said first and second elastic arms to move toward or away from each other along the elastic direction; and
    a limiting arm extending from said first end edge of said first elastic arm and including a neck portion proximate to said first end edge and having a width ($W_1$) equal to or slightly less than the width ($P_1$), and a limiting portion extending from one end of said neck portion distal from said first end edge and having a projected area larger than that of said neck portion;
  wherein, said neck portion and said limiting portion are located on the same plane, said fixed through hole of each said panel member including a narrow long portion extending in the first direction and having a width ($P_2$), and a receiving portion extending from a long side of said narrow long portion and having the width ($P_1$) which is smaller than the width ($P_2$), said limiting portion having a width ($W_2$) in the first direction equal to or slightly less than the width ($P_2$), when said first and second elastic arms are pressed to move said limiting arm close to said second elastic arm, said limiting portion can extend through said narrow long portions of said fixed through holes of said panel members and out of said second surface; and when said first and second elastic arms are released from being pressed, said limiting arm moves away from said second elastic arm, a surface of said limiting portion that is proximate to said neck portion abuts against said second surface, and said neck portion abuts against peripheral edges of said fixed through holes in the elastic direction and is received in said receiving portions of said fixed through holes.

7. The device as claimed in claim 6, wherein said connecting portion has an arc-shaped cross section that is open toward said first and second elastic arms.

8. The device as claimed in claim 6, wherein said fastening member further includes a fixed arm extending from said first end edge of said second elastic arm, said fixed arm including a fixed portion extending in a direction away from said limiting arm for fixed connection with said first surface.

9. The device as claimed in claim 6, wherein said fastening member further includes another limiting arm extending from said first end edge of said second elastic arm, said fixed through hole of each said panel member including a narrow long portion extending in the first direction and having a width ($P_2$), and two receiving portions respectively extending from two opposite long sides of said narrow long portion away from each other, each of said receiving portions having the width ($P_1$) which is smaller than the width ($P_2$), said two limiting arms being respectively and symmetrically disposed in said receiving portions when said first and second elastic arms are released from being pressed.

10. The device as claimed in claim 9, wherein said fixed through hole of each said panel member further includes a neck-rotating portion, said neck-rotating portion including two straight sections respectively spaced apart from said receiving portions in the elastic direction, at least two curved sections each extending curvedly from one end of a respective said receiving portion distal from said narrow long portion and symmetrically opposite to each other, and two shoulder sections each connected between one of said curved sections and one end of said straight section, each of said curved sections having a radius of curvature equal to $\frac{1}{2}(P_1)$, said shoulder sections being provided for abutment with said neck portions of said limiting arms.

11. The device as claimed in claim 6, wherein one of said panel members further has at least one protrusion protruding toward the other one of said panel members, the other one of said panel members further having an aperture corresponding in shape to said protrusion for extension of said protrusion therethrough.

12. A fastening member for fastening and unfastening at least two panel members that are disposed one over the other, one of the panel members having a first surface, the other one of the panel members having a second surface facing away from the first surface, each of the panel members further having a fixed through hole, the fixed through hole having at least a portion with a width $(P_1)$ extending in a first direction parallel to a width of each panel member, said fastening member comprising:
  first and second elastic arms spaced apart from each other in an elastic direction that is perpendicular to the first direction, each of said first and second elastic arms having a first end edge for being proximate to the first surface, and a second end edge for being relatively distal from the first surface, said first end edge having a width larger than the width $(P_1)$;
  a connecting portion connected between said second end edges of said first and second elastic arms to allow said first and second elastic arms to move toward or away from each other along the elastic direction;
  a limiting arm extending from said first end edge of said first elastic arm and including
    a neck portion proximate to said first end edge and having a width $(W_1)$ equal to or slightly less than the width $(P_1)$, and
    a limiting portion extending from one end of said neck portion distal from said first end edge and having a projected area larger than that of said neck portion;
  wherein, said neck portion and said limiting portion of said limiting arm are located in mutually perpendicular planes and have similar width $(W_1)$, said limiting portion having a length $(L_1)$ in the elastic direction, the fixed through hole of each panel member further having a length in the elastic direction at least equal to the length (L1), when said first and second elastic arms are pressed to move said limiting arm close to said second elastic arm, said limiting portion can extend through the fixed through holes of the panel members and out of the second surface; and when said first and second elastic arms are released from being pressed, said limiting arm moves away from said second elastic arm, a surface of said limiting portion that is proximate to said neck portion abuts against the second surface, and said neck portion abuts against peripheral edges of the fixed through holes in the elastic direction.

13. The fastening member as claimed in claim 12, wherein said fastening member further comprises another limiting arm extending from said first end edge of said second elastic arm, said two limiting arms being symmetrically provided, and when said first and second elastic arms are pressed, said limiting portions of said limiting arms can extend through the fixed through holes of the panel members.

14. The fastening member as claimed in claim 12, wherein said connecting portion has an arc-shaped cross section that is open toward said first and second elastic arms.

15. The fastening member as claimed in claim 14, wherein one of said first and second elastic arms has an arc-shaped cross section that is open toward the other one of said first and second elastic arms, and a radius of curvature of said one of said first and second elastic arms being different from that of said connecting portion.

16. A device comprising:
  at least two panel members disposed one over the other, one of said panel members having a first surface, the other one of said panel members having a second surface facing away from said first surface, each of said panel members further having a fixed through hole, said fixed through hole having at least a portion with a width $(P_1)$ extending in a first direction parallel to a width of each said panel member; and
  a fastening member for fastening and unfastening said panel members and including
    first and second elastic arms spaced apart from each other in an elastic direction that is perpendicular to the first direction, each of said first and second elastic arms having a first end edge proximate to said first surface, and a second end edge relatively distal from said first surface, said first end edge having a width larger than the width $(P_1)$;
    a connecting portion connected between said second end edges of said first and second elastic arms to allow said first and second elastic arms to move toward or away from each other along the elastic direction; and
    a limiting arm extending from said first end edge of said first elastic arm and including a neck portion proximate to said first end edge and having a width $(W_1)$ equal to or slightly less than the width $(P_1)$, and a limiting portion extending from one end of said neck portion distal from said first end edge and having a projected area larger than that of said neck portion;
  wherein, said neck portion and said limiting portion of said limiting arm are located in mutually perpendicular planes and have similar width $(W_1)$, said limiting portion having a length $(L_1)$ in the elastic direction, said fixed through hole of each said panel member having a length in the elastic direction at least equal to the length $(L_1)$, when said first and second elastic arms are pressed to move said limiting arm close to said second elastic arm, said limiting portion can extend through said fixed through holes of said panel members and out of said second surface; and when said first and second elastic arms are released from being pressed, said limiting arm moves away from said second elastic arm, a surface of said limiting portion that is proximate to said neck portion abuts against said second surface, and said neck portion abuts against peripheral edges of said fixed through holes in the elastic direction.

17. The device as claimed in claim 16, wherein said fastening member further includes another limiting arm extending from said first end edge of said second elastic arm, said two limiting arms being symmetrically provided, the length of said fixed through hole of each said panel member in the elastic direction being equal to at least twice the length $(L_1)$, wherein, when said first and second elastic arms are pressed, said limiting portions of said limiting arms can extend through said fixed through holes of said panel members.

18. The device as claimed in claim 16, wherein one of said panel members further has at least one protrusion protruding toward the other one of said panel members, the other one of said panel members further having an aperture corresponding in shape to said protrusion for extension of said protrusion therethrough.

19. A device comprising:
   at least two panel members disposed one over the other, one of said panel members having a first surface, the other one of said panel members having a second surface facing away from said first surface, each of said panel members further having a fixed through hole, said fixed through hole having at least a portion with a width ($P_1$) extending in a first direction parallel to a width of each said panel member; and
   a fastening member for fastening and unfastening said panel members and including
      first and second elastic arms spaced apart from each other in an elastic direction that is perpendicular to the first direction, each of said first and second elastic arms having a first end edge proximate to said first surface, and a second end edge relatively distal from said first surface, said first end edge having a width larger than the width ($P_1$);
      a connecting portion connected between said second end edges of said first and second elastic arms to allow said first and second elastic arms to move toward or away from each other along the elastic direction; and
      a limiting arm extending from said first end edge of said first elastic arm and including a neck portion proximate to said first end edge and having a width ($W_1$) equal to or slightly less than the width ($P_1$), and a limiting portion extending from one end of said neck portion distal from said first end edge and having a projected area larger than that of said neck portion;
   wherein, said neck portion and said limiting portion are located on the same plane, said fixed through hole of each said panel member including a narrow long portion extending in the first direction and having a width ($P_2$), and a receiving portion extending from a long side of said narrow long portion and having the width ($P_1$) which is smaller than the width ($P_2$), said limiting portion having a width ($W_2$) in the first direction equal to or slightly less than the width ($P_2$), when said first and second elastic arms are pressed to move said limiting arm close to said second elastic arm, said limiting portion can extend through said narrow long portions of said fixed through holes of said panel members and out of said second surface; and when said first and second elastic arms are released from being pressed, said limiting arm moves away from said second elastic arm, a surface of said limiting portion that is proximate to said neck portion abuts against said second surface, and said neck portion abuts against peripheral edges of said fixed through holes in the elastic direction and is received in said receiving portions of said fixed through holes of said panel members.

20. The device as claimed in claim 19, wherein one of said panel members further has at least one protrusion protruding toward the other one of said panel members, the other one of said panel members further having an aperture corresponding in shape to said protrusion for extension of said protrusion therethrough.

* * * * *